United States Patent
Funagi

(10) Patent No.: US 10,674,095 B2
(45) Date of Patent: Jun. 2, 2020

(54) IMAGE PROCESSING APPARATUS AND CONTROL METHOD FOR CONTROLLING THE SAME

(71) Applicant: CANON KABUSHIKI KAISHA, Tokyo (JP)

(72) Inventor: Tetsuhiro Funagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/905,262

(22) Filed: Feb. 26, 2018

(65) Prior Publication Data
US 2018/0255249 A1  Sep. 6, 2018

(30) Foreign Application Priority Data
Mar. 3, 2017  (JP) .................. 2017-040923

(51) Int. Cl.
| | |
|---|---|
| H04N 5/272 | (2006.01) |
| H04N 7/18 | (2006.01) |
| G08B 13/196 | (2006.01) |
| G11B 27/00 | (2006.01) |
| G11B 27/036 | (2006.01) |
| H04N 5/77 | (2006.01) |
| H04N 7/14 | (2006.01) |

(52) U.S. Cl.
CPC ....... *H04N 5/272* (2013.01); *G08B 13/19604* (2013.01); *G08B 13/19686* (2013.01); *G11B 27/002* (2013.01); *G11B 27/036* (2013.01); *H04N 5/77* (2013.01); *H04N 7/18* (2013.01); *H04N 7/14* (2013.01)

(58) Field of Classification Search
None
See application file for complete search history.

(56) References Cited

U.S. PATENT DOCUMENTS

| | | | |
|---|---|---|---|
| 7,227,567 B1 * | 6/2007 | Beck | H04N 7/147 348/14.01 |
| 9,892,538 B1 * | 2/2018 | Balasubramanian | G06T 11/60 |
| 2014/0161312 A1 | 6/2014 | Adachi | |

FOREIGN PATENT DOCUMENTS

| | | |
|---|---|---|
| EP | 3043329 A2 | 7/2016 |
| JP | 2009-225398 A | 10/2009 |
| WO | 2016/149576 A1 | 9/2016 |

* cited by examiner

*Primary Examiner* — Heather R Jones
(74) *Attorney, Agent, or Firm* — Canon U.S.A., Inc. IP Division

(57) ABSTRACT

An image processing apparatus includes an identifying unit configured to identify a protection region for protecting privacy, a setting unit configured to set, as an image to be used as a background image, an image selected from existing images based on a user operation, and an image combining unit configured to combine a protection image with the protection region identified by the identifying unit and included in the background image set by the setting unit to generate a privacy protection image.

12 Claims, 8 Drawing Sheets

IMAGE PROCESSING APPARATUS AND CONTROL METHOD FOR CONTROLLING THE SAME

BACKGROUND OF THE INVENTION

Field of the Invention

The present invention relates to an image processing apparatus generating an image including a protection image, and a control method for controlling the same.

Description of the Related Art

While the installation of a monitoring camera is spread, the protection of the privacy of an individual appearing on a monitoring camera video increases in importance. The publication of Japanese Patent Application Laid-Open No. 2009-225398 discusses the process of generating from an input image a foreground image including an image of a person and a background image not including the image of the person, and according to a user's authority, controlling whether to superimpose the foreground image on the background image. The publication of Japanese Patent Application Laid-Open No. 2009-225398 discusses a technique for, instead of choosing not to superimpose the foreground image, superimposing a protection image (a concealment image) obtained by performing a concealment process (a mask process or a filter process) on the foreground image, thereby generating a privacy protection image.

However, a region that should be protected through the concealment process may not be protected in the privacy protection image. For example, a case is considered where a human body region is detected from an input image, a background image is generated based on an image of a region that is not the human body region, a protection region is identified based on the comparison between the background image and a captured image, and the identified protection region is combined with a concealment image. In this case, if the process of detecting a human body in the input image is failed, a background image including the human body may be generated. If the human body is included in the background image, a region that should be concealed by rights may not be concealed. That is, a region that should be protected is not protected in a privacy protection image.

SUMMARY OF THE INVENTION

To achieve more appropriate privacy protection in the generation of a privacy protection image, the present invention has the following configuration, for example.

According to an aspect of the present invention, an image processing apparatus includes an identifying unit configured to identify a protection region for protecting privacy, a setting unit configured to set, as an image to be used as a background image, an image selected from existing images based on a user operation, and an image combining unit configured to combine a protection image with the protection region identified by the identifying unit and included in the background image set by the setting unit to generate a privacy protection image.

Further features of the present invention will become apparent from the following description of exemplary embodiments with reference to the attached drawings.

DESCRIPTION OF THE EMBODIMENTS

With reference to the accompanying drawings, exemplary embodiments will be described in detail below. The configurations illustrated in the following exemplary embodiments are mere examples, and the present invention is not limited to the configurations illustrated in the exemplary embodiments.

Figure 1:
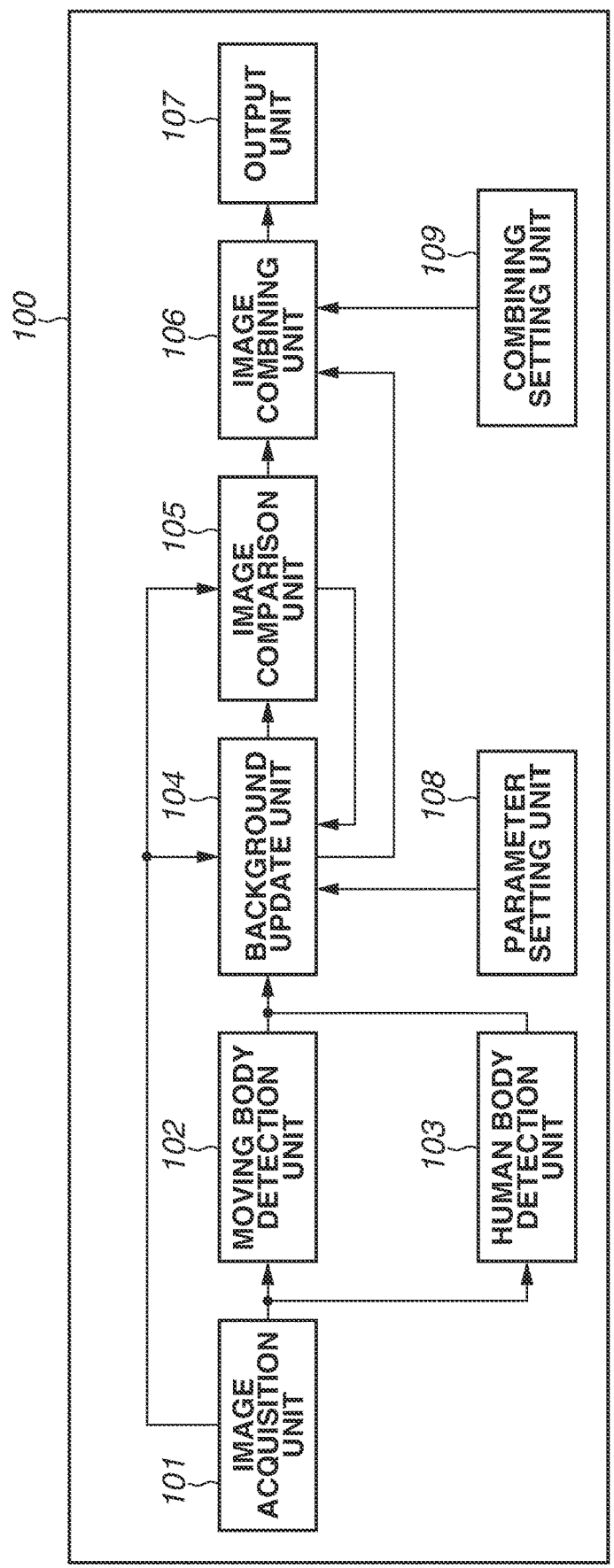
FIG. 1 is a block diagram illustrating an example of a functional configuration of an image processing apparatus according to a first exemplary embodiment.

FIG. 1 is a block diagram illustrating an example of the functional configuration of an image processing apparatus 100. An image acquisition unit 101 sequentially acquires images at predetermined intervals from an image capturing unit including a lens and a sensor and provides each of the acquired images (hereinafter, an "acquired image") for a moving body detection unit 102, a human body detection unit 103, a background update unit 104, and an image comparison unit 105. Although in the present exemplary embodiment, a configuration is described in which the image acquisition unit 101 acquires an image from the image capturing unit, the image capturing unit may be included in the image acquisition unit 101, or may be an external apparatus of the image processing apparatus 100. Alternatively, the configuration may be such that the image acquisition unit 101 acquires an image from an external storage device, or the image acquisition unit 101 reads an image from a memory within the image processing apparatus 100.

The moving body detection unit 102 performs a moving body detection process for detecting a moving body from the acquired image provided by the image acquisition unit 101. The moving body detection unit 102 compares the acquired image with a background model, thereby detecting a moving body (a background subtraction method). The background model is appropriately updated by the moving body detection unit 102 by following changes in images. As described above, based on the comparison between an acquired image and another image (a background model) different in the image capturing time from the acquired image, the moving body detection unit 102 detects a moving body region.

The moving body detection unit 102 provides moving body information obtained by the moving body detection process for the background update unit (update means) 104. The moving body information according to the present exemplary embodiment includes information about the central coordinates (position information) and a circumscribed rectangle (shape information) of the moving body detected from the acquired image. The moving body detection unit 102 executes a moving body detection process on each of a plurality of images acquired by the image acquisition unit 101 and provides moving body information obtained as a result of the moving body detection process for the background update unit 104.

The human body detection unit 103 performs a human body detection process for detecting a human body from the acquired image provided by the image acquisition unit 101. The human body detection unit 103 compares the image acquired by the image acquisition unit 101 with a pattern image determined in advance, thereby detecting a human body (a pattern matching method). The method for detecting the human body with the human body detection unit 103 is not limited to the above method. Alternatively, the human body may be detected using feature amounts, such as the color, the brightness, the density gradient, and the texture, of the image and a technique such as machine learning. The human body detection unit 103 provides human body information obtained through the human body detection process for the background update unit 104. The human body information includes information about the central coordinates (position information) and a circumscribed rectangle (shape information) of the human body detected from the acquired image. The human body detection unit 103 executes a human body detection process on each of a plurality of images acquired by the image acquisition unit 101 and provides human body information obtained as a result of the human body detection process for the background update unit 104.

On the basis of the acquired image provided by the image acquisition unit 101, the moving body information provided by the moving body detection unit 102, the human body information provided by the human body detection unit 103, and protection region proportion information provided by the image comparison unit 105, the background update unit 104 generates or updates a background image. Accordingly, the moving body information provided by the moving body detection unit 102, the human body information provided by the human body detection unit 103, and protection region proportion information provided by the image comparison unit 105 function as identifying means for identifying a protection region for protecting privacy. The protection region proportion information will be described below. The background update unit 104 provides the generated or updated background image for the image comparison unit 105 and an image combining unit 106. Thus, the background update unit 104 serves as a setting means for setting, as an image to be used as a background image, an image selected from existing images based on a user operation. The image combining unit 106 serves as an image combining means for combining a protection image with the protection region identified by the identifying means and included in the background image set by the setting means to generate a privacy protection image.

The image comparison unit 105 compares the acquired image provided by the image acquisition unit 101 with the background image provided by the background update unit 104, thereby identifying a protection region and generating protection region information and protection region proportion information. The protection region information indicates the position and the shape of the identified protection region in the acquired image. The image comparison unit 105 provides the generated protection region information for the image combining unit 106. The protection region proportion information indicates the proportion of the area of the protection region to the area of the acquired image. The image comparison unit 105 provides the generated protection region proportion information for the background update unit 104.

On the basis of a combining setting (described below) made by a combining setting unit 109, the image combining unit 106 selects a background image for use in combining and combines a predetermined image with the protection region included in the selected background image and indicated by the protection region information acquired from the image comparison unit 105, thereby generating a privacy protection image. The method for generating the privacy protection image by combining is not limited to this. Alternatively, for example, a protection image obtained by performing a concealment process on an image of the protection region may be superimposed on the background image. The image combining unit 106 provides the generated privacy protection image for an output unit 107. The background image to be used by the image combining unit 106 is an image selected by a user between the background image provided by the background update unit 104 and a set image selected from existing images by a user operation. User interfaces provided by the combining setting unit 109 for making these selections will be described below with reference to FIGS. 4 and 5.

The output unit 107 (output means) performs display control to display on a display apparatus the privacy protection image provided by the image combining unit 106. The display apparatus may be included in the output unit 107, or may be connected as an external apparatus to the image processing apparatus 100. In a case where the image processing apparatus 100 is mounted on a network camera, the output unit 107 transmits the privacy protection image to a display apparatus connected to the image processing apparatus 100 via a network. In a case where the image processing apparatus 100 is mounted on a display apparatus, the image processing apparatus 100 combines a protection image with a background image acquired from a network camera, thereby generating a privacy protection image. The image processing apparatus 100 then displays the generated privacy protection image on a display unit. The output unit 107 is not limited to a unit for outputting the privacy protection image to a display apparatus for display, and may be a unit for outputting the privacy protection image to an internal or external storage device of the image processing apparatus 100 to store the privacy protection image.

A parameter setting unit 108 acquires a time threshold and a weighted value. The method for acquiring the time threshold and the weighted value is not particularly limited. For example, the parameter setting unit 108 can acquire the time threshold and the weighted value based on specification provided by the user, and can also acquire the time threshold and the weighted value by reading the time threshold and the weighted value from a memory in which default values are stored. The parameter setting unit 108 provides the acquired time threshold and weighted value for the background update unit 104.

On the basis of a user operation, the combining setting unit 109 sets an image to be used as a background image by the image combining unit 106. The combining setting unit 109 generates information (hereinafter, "combining setting information") regarding the selection of a background image to be used and a time period based on a user operation and provides the combining setting information for the image combining unit 106. The combining setting unit 109 can also acquire the combining setting information by reading the combining setting information from a memory or a file. The combining setting information will be described below.

Figure 2:
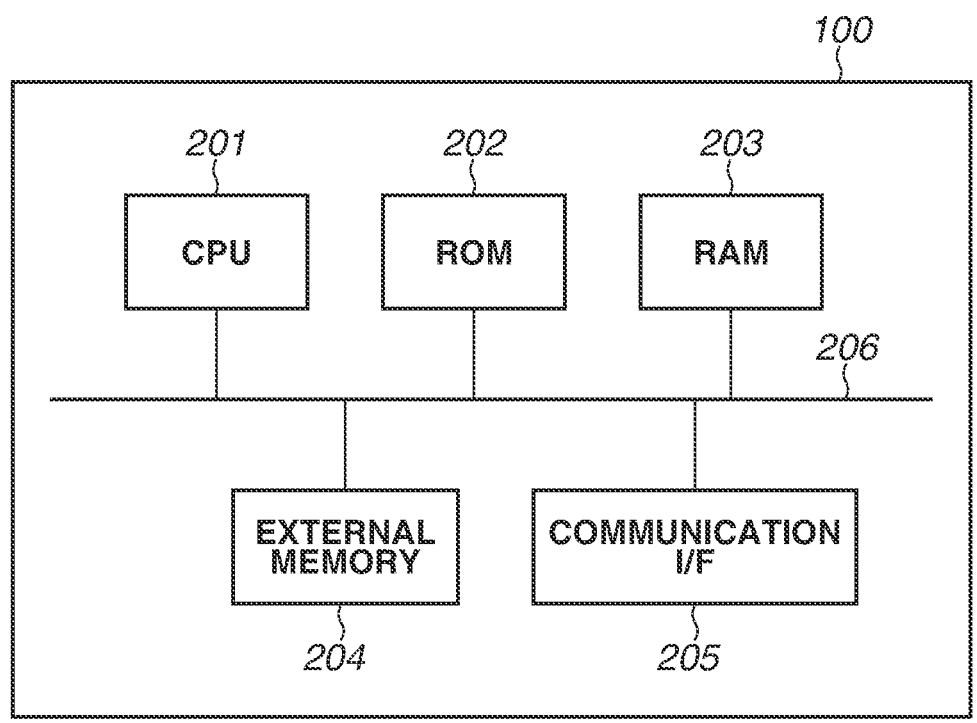
FIG. 2 is a block diagram illustrating an example of a hardware configuration of the image processing apparatus according to the first exemplary embodiment.

FIG. 2 is a diagram illustrating an example of the hardware configuration of the image processing apparatus 100. The image processing apparatus 100 includes a central processing unit (CPU) 201, a read-only memory (ROM) 202, a random-access memory (RAM) 203, an external memory 204, a communication interface (I/F) 205, and a system bus 206.

The CPU 201 is a processor for performing overall control of operations in the image processing apparatus 100 and controls the components (202 to 205) via the system bus 206. The ROM 202 is a non-volatile memory for storing a control program necessary for the CPU 201 to perform processing. The program may be stored in the external memory 204 or an attachable and detachable storage medium. The RAM 203 functions as a main memory or a work area for the CPU 201. That is, when performing processing, the CPU 201 loads a necessary program from the ROM 202 into the RAM 203 and executes the program, thereby achieving various functional operations.

The external memory 204 stores, for example, various types of data and various types of information that are necessary when the CPU 201 performs processing using a program. The external memory 204 stores, for example, various types of data and various types of information that are obtained by the CPU 201 performing processing using a program. The communication I/F 205 is an interface for communicating with an external apparatus. The communication I/F 205 is, for example, a local area network (LAN) interface. The system bus 206 connects the CPU 201, the ROM 202, the RAM 203, the external memory 204, and the communication I/F 205 so that these components can communicate with each other.

The image processing apparatus 100 may be present independently, or may be mounted on a network camera, a display apparatus, or a video recording apparatus. In a case where the image processing apparatus 100 is mounted on a network camera, an external apparatus is assumed to be a display apparatus or a video recording apparatus connected to the network camera via a network. In a case where the image processing apparatus 100 is mounted on a display apparatus, an external apparatus is assumed to be a network camera or a video recording apparatus connected to the display apparatus via a network.

Figure 3:
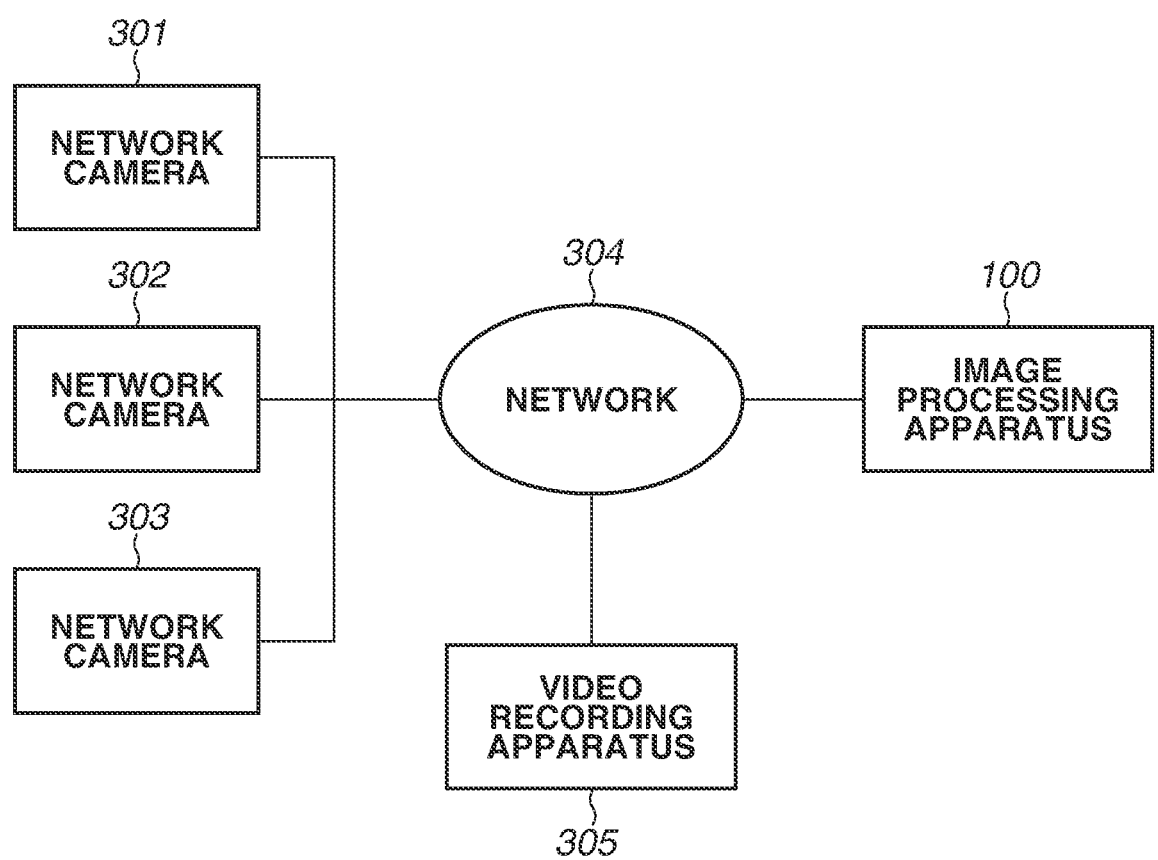
FIG. 3 is a block diagram illustrating an example of a system configuration of a video display system according to the first exemplary embodiment.

FIG. 3 is a diagram illustrating an example of the system configuration of a video display system according to the present exemplary embodiment. In the video display system, the image processing apparatus 100, a plurality of network cameras 301, 302, and 303, and a video recording apparatus 305 are connected to each other via a network 304 so that these apparatuses can communicate with each other. The video recording apparatus 305 records, for example, each of videos from the network cameras 301, 302, and 303. The image processing apparatus 100 is mounted on, for example, a display apparatus. Then, the image processing apparatus 100 acquires videos from the network cameras 301, 302, and 303, performs the above processing on each video, and displays a protection image. As a matter of course, the form may be such that a display apparatus is present as an external apparatus of the image processing apparatus 100, and the display apparatus and the image processing apparatus 100 are connected together via the network 304. Further, the image processing apparatus 100 can request a recorded video with a specified date and time obtained by a particular one of the network cameras 301, 302, and 303 from the video recording apparatus 305 and acquire the recorded video.

Next, the method for generating a background image by the background update unit 104 is described. The background update unit 104 manages a stable background time with respect to each of regions (blocks) into which a background image is divided with a predetermined size. The "stable background time" refers to the period in which a protection target to be identified based on moving body information or human body information is not detected in each block. The process of generating a background image by the background update unit 104 is described in three cases, namely, (A) the first image, (B) a case where the proportion of a protection region is less than a threshold, and (C) a case where the proportion of a protection region is equal to or greater than the threshold.

(A) First Background Image

In a case where a background image has not yet been generated, the background update unit 104 stores as an initial background image an acquired image provided by the image acquisition unit 101. The background update unit 104 sets the stable background times of all the blocks of the background image to 0.

(B) In a Case where the Proportion of a Protection Region is Less than a Threshold In this case, the proportion of the area of a protection region, indicated by protection region proportion information provided by the image comparison unit 105, to the area of an image is less than a threshold. In this case, the background update unit 104 updates (increments) the stable background times corresponding to blocks other than a block to which a moving body region identified by moving body information or a human body region identified by human body information belongs. The background update unit 104 sets the stable background time corresponding to the block to which the moving body region or the human body region belongs to 0. The background update unit 104 updates the background image using an image corresponding to a block of which the updated stable background time exceeds a time threshold. The background update unit 104 sets the stable background time corresponding to the block used to update the background image to 0.

(C) In a Case where the Proportion of a Protection Region is Equal to or Greater than the Threshold In this case, the proportion of the area of a protection region, indicated by protection region proportion information provided by the image comparison unit 105, to the area of an image is equal to or greater than the threshold. This can occur, for example, in a case where the state of illumination abruptly changes, or a case where the image capturing range of the image capturing unit changes by pan, tilt, or zoom control. In such a case, the background update unit 104 updates (increments) the stable background times using human body information and without using moving body information. Then, in a case where there is a block of which the stable background time exceeds the time threshold, the background update unit 104 updates the background image in this block, thereby generating a background image. More specifically, the background update unit 104 sets the stable background time corresponding to a block to which a human body region identified by the human body information belongs to 0. The background update unit 104 then updates (increments) the stable background time corresponding to a block to which the human body region does not belong. Then, the background update unit 104 updates the background image using an image corresponding to a block of which the stable background time exceeds the time threshold. The background update unit 104 resets a background model for the moving body detection unit 102 to detect a moving body.

As described above, based on the area of a protection region and the area of an acquired image (a processing target image), the image comparison unit 105 controls the background update unit 104. According to this control, if the proportion of the area of the protection region becomes larger, a moving body region is not used to update a background image, and a human body region is used. That is, if the proportion of the area of the protection region becomes larger, the background update unit 104 generates (updates) a background image using the detection result of a human body region detected based on a feature in an image and without using the detection result of a moving body region detected based on the comparison between images.

The "protection region" refers to a region in which there is a predetermined difference between the luminance of the processing target image and the luminance of the background image in a case where the luminance of the processing target image and the luminance of the background image are compared with respect to each region. Furthermore, in this example, based on the proportion of the protection region, it is determined whether to use the detection result obtained by the moving body detection unit 102 to generate a background image. The present invention, however, is not limited to this. For example, the above determination may be made using the size of the protection region or other information regarding the protection region, instead of using the proportion of the protection region. That is, in a case where an evaluation value regarding the area of a protection region (a particular region) is equal to or greater than a threshold, the image comparison unit 105 performs control to generate a background image without using moving body information.

A background image is updated (generated) as described above, whereby even in a case where a change in the environment, such as a fluctuation in illumination, occurs, it is possible to display a privacy protection image protecting a protection target with higher accuracy.

Next, the combining setting unit 109 will be described. The image combining unit 106 uses, as a background image, any of an initial background image provided by the background update unit 104, an updated background image provided by the background update unit 104, and an existing image set as a background image with a user operation in the combining setting unit 109. In accordance with a user operation, the combining setting unit 109 sets which of the images is to be used as the background image.

Figure 4:
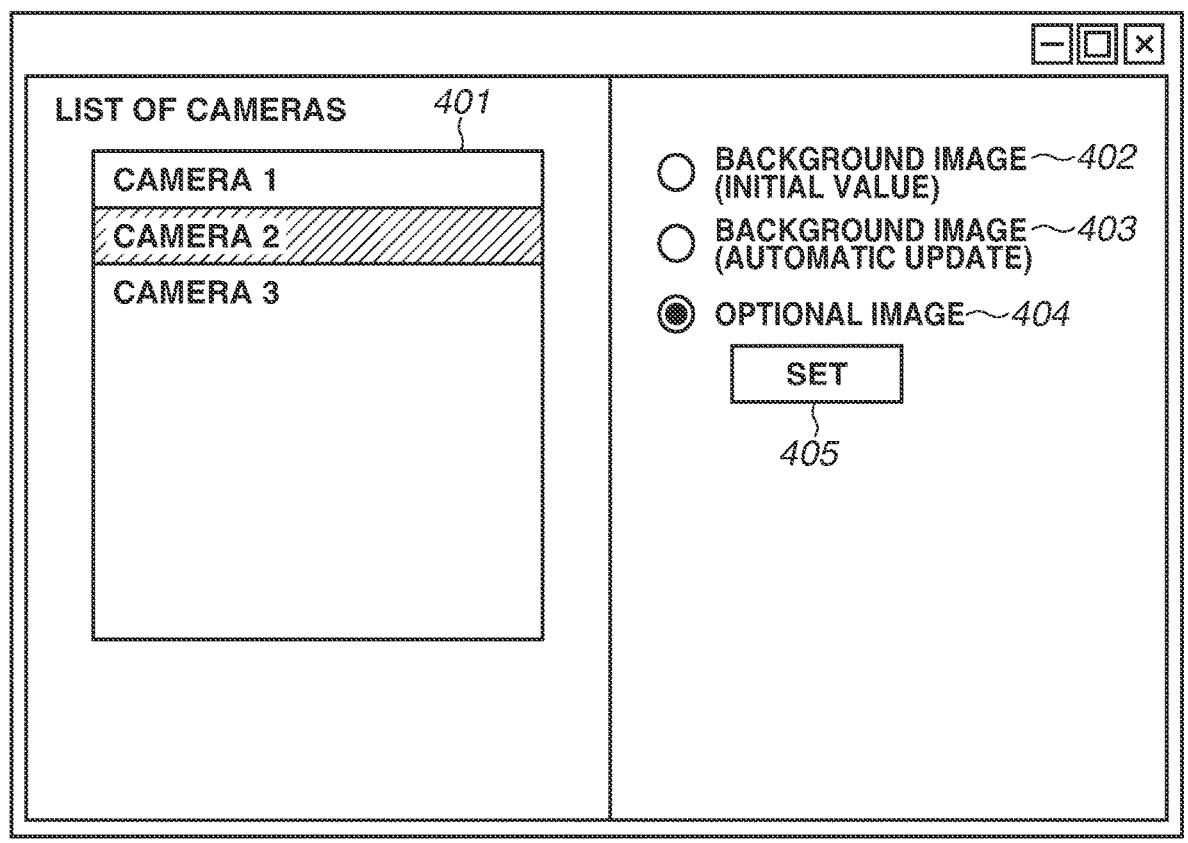
FIG. 4 is a diagram illustrating an example of a setting operation user interface (UI) in a combining setting according to the first exemplary embodiment.

FIG. 4 is a diagram illustrating an example of a setting operation user interface (UI) provided by the combining setting unit 109. A list of cameras 401 indicates a list of network cameras for providing acquired images to be processed by the image processing apparatus 100. If one of the network cameras is selected in the list of cameras 401, the setting details about the selected network camera is reflected on the display of the setting operation UI. Operation items 402, 403, and 404 are used to specify the selection of a background image for each network camera. If the operation item 402 ("background image (initial value)") is selected, a setting is made so that a privacy protection image is generated using a background image (an initial background image) generated first by the background update unit 104 for an acquired image from the currently selected camera. If the operation item 403 ("background image (automatic update)") is selected, a setting is made so that a privacy protection image is generated using the latest background image generated by the background update unit 104 for an acquired image from the currently selected camera. If the operation item 404 ("optional image") is selected, a setting is made so that a privacy protection image is generated using an image (hereinafter, a set image) selected from among existing images through a UI in FIG. 5 as a background image and without using a background image generated by the background update unit 104. With the operation items 402 to 404, the type of a background image to be used to generate a privacy protection image is set.

Figure 5:
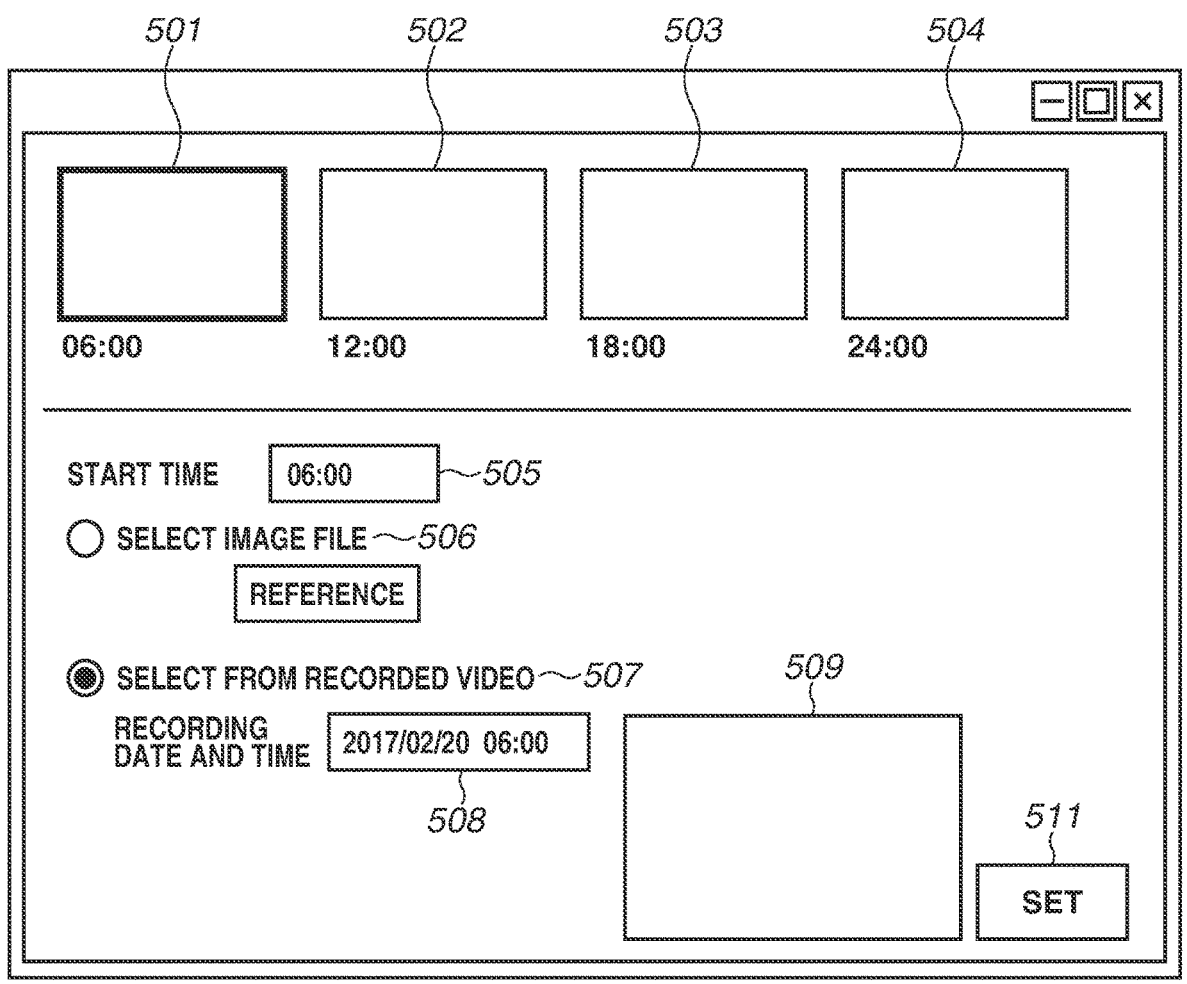
FIG. 5 is a diagram illustrating an example of a setting operation UI for an optional image in a combining setting according to the first exemplary embodiment.

FIG. 5 is a diagram illustrating an example of a setting operation UI provided by the combining setting unit 109. Using this setting operation UI, the user can make detailed settings in a case where the type of the background image is "optional image". For example, if a set button 405 is pressed in the state where the operation item 404 ("optional image") is selected on the setting screen in FIG. 4, the setting operation UI screen in FIG. 5 is displayed. Through the setting operation UI in FIG. 5, the user can select a set image to be used as the background image from among existing images, make settings, and set the time period in which the set image is to be used as the background image.

FIG. 5 illustrates preview regions 501 to 504 of set images. FIG. 5 also illustrates, together with the display of the previews of the set images, the start time of the time period in which a protection image is to be generated using each set image as the background image. In FIG. 5, four time periods can be set, and four preview regions 501 to 504 are displayed. The number of time periods, however, is not limited to four, and may be more or less than four. As a matter of course, the user may be allowed to set the number of time periods. The display of a preview corresponding to the time period in which an image has not yet been set is, for example, grayed out to indicate that an image has not yet been set. Further, although only the start time of each time period is displayed, both the start and end times may be displayed. If any of the preview regions 501 to 504 is selected, the set image and the time period that have already been set for the selected preview region are reflected on operation items 505 to 508. The user can select (change) the set image and set (change) the time period for the selected preview region.

The operation item 505 is an item for setting the start time of the time period in which the set image of the selected preview region is to be used as the background image. The end time of the time period may be able to be set by the user through a user interface similar to that of the operation item 505, or may be automatically set by the combining setting unit 109 based on the relationship with the start time of another image. The set image is selected from among existing images. In the present exemplary embodiment, the set image can be selected from an image file or a recorded video. The image file can be used with selection of the operation item 506, and the recorded video can be selected with selection of the operation item 507. In the operation item 506, a path to the image file saved in an internal memory such as a hard disk drive (HDD), or a Uniform Resource Locator (URL) or a Uniform Resource Identifier (URI) indicating the address of the image file recorded externally can be specified. An image identified by the specified path or address is set as the background image to be used by the image combining unit 106. In the operation item 507, the date and time of the recorded video can be specified in a recording date and time 508. A recorded image with the date and time specified in the recording date and time 508 is acquired from the video recording apparatus 305 and set as the background image to be used by the image combining unit 106. Alternatively, a frame number may be specified in the recording date and time 508.

The combining setting unit 109 displays in a preview region 509 the image acquired in accordance with the specifying of the operation item 506 or 507. The initial value of the time of the recording date and time 508 may be determined according to the setting value in the start time of the operation item 505. If an image to be used as the background image is selected, the selected image is associated with a time period of which the start time is the time set in the operation item 505. That is, the start time of the time period is set independently of the recording time. In the preview region 509, the image can be displayed in a size larger than those of the preview regions 501 to 504. The user can more correctly determine whether the image is appropriate as the background image based on the display of the preview region 509. If a recorded video is acquired according to the specifying of the operation item 507, the recorded video may be reproduced in the preview region 509. By observing the reproduced moving image, the user can select an image to be used as the background image. The date of the recording date and time 508 may be selected from the display of a calendar. In such a case, if the date is set from the calendar, the combining setting unit 109 may acquire the recording state of the network camera on the set date from the video recording apparatus 305, display the time period in which recording data is present, and allow the user to select a time from the display of the time period. For example, the combining setting unit 109 may display as a slide bar the time period in which recording data is present, and allow the user to select a recording frame at a desired time by operating the slide bar. Through the above setting screen, an optional existing image is associated with the time period in which the existing image is to be used, and this association is recorded as setting information. If a set button 511 is pressed, the set image and the time period specified for the selected preview region using the operation items 505 to 507 are finalized and held as combining setting information.

Figure 6:
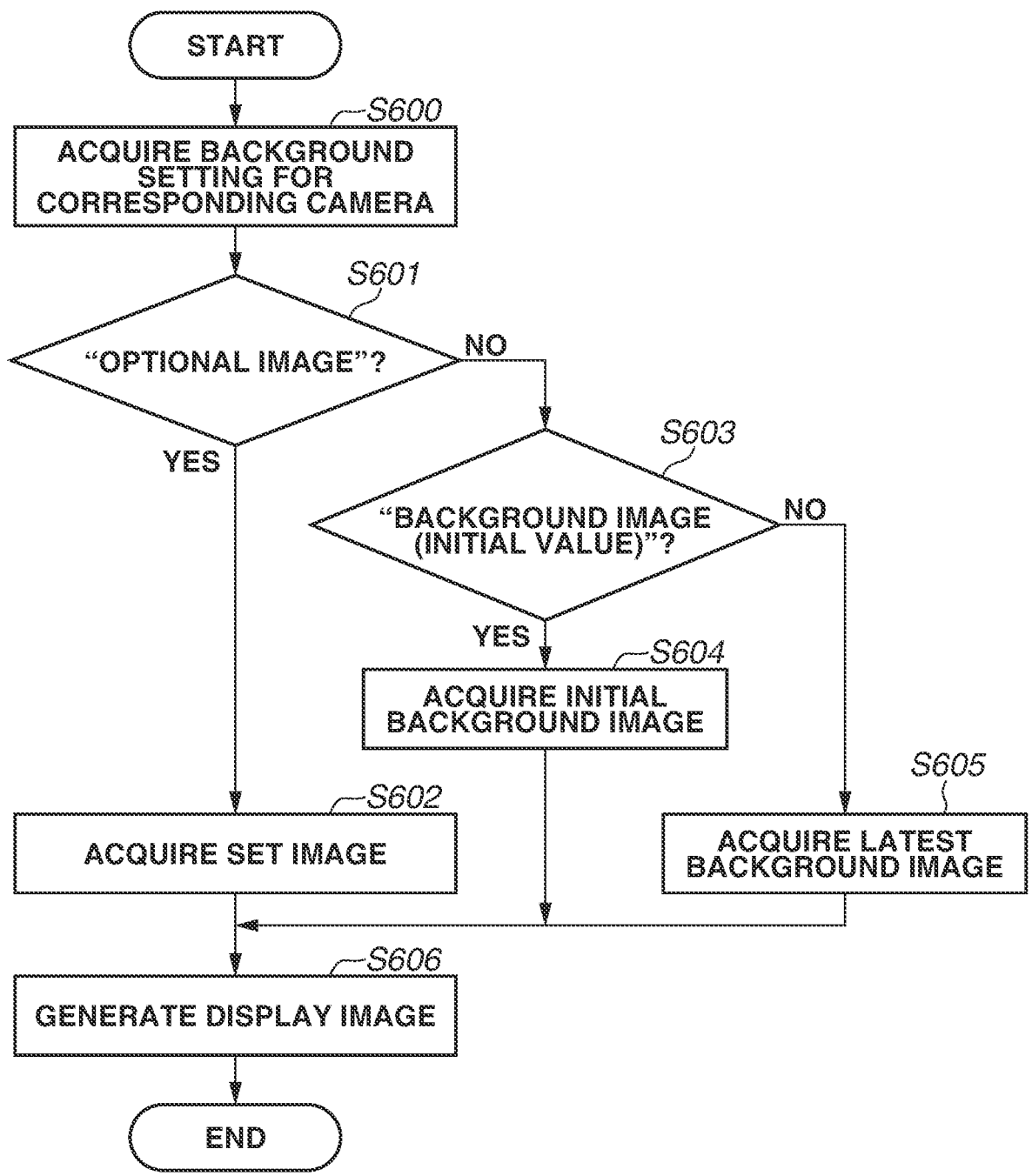
FIG. 6 is a flowchart illustrating an example of a process of determining a background image according to the first exemplary embodiment.

FIG. 6 is a flowchart illustrating an example of the process of determining a background image performed by the image combining unit 106. Identifying a protection region is performed before this flowchart or performed in parallel to this flowchart, and may be performed constantly. As described above with reference to FIG. 4, the type of a background image is set using the setting operation UI. Combining setting information set by the combining setting unit 109 holds this type as a background setting. In step S600, the image combining unit 106 acquires the background setting for an acquired image as a processing target from the combining setting information set by the combining setting unit 109. The image combining unit 106 determines which of "background image (initial value)", "background image (automatic update)", and "optional image" the acquired background setting is. If the background setting is "optional image" (YES in step S601), then in step S602, the image combining unit 106 acquires a set image indicated by the combining setting information and sets the set image as the background image. The setting information includes a path or an address specified in the operation item 506 on the setting operation UI screen illustrated in FIG. 5, or a date and time specified in the recording date and time 508 of the operation item 507. On the basis of this piece of information, the image combining unit 106 acquires the set image from existing images and uses the set image as the background image. Alternatively, when an image is set as a set image on the setting operation UI screen, the image may be read and held at a predetermined address, and the address may be recorded in the setting information. In this case, the image combining unit 106 can obtain the set image from the address recorded in the setting information.

If it is determined that the background setting is not "optional image" but "background image (initial value)" (NO in step S601 and YES in step S603), then in step S604, the image combining unit 106 acquires the first background image for the acquired image from the background update unit 104 and sets the first background image as the background image. If there is no initial value of the background image, a background image to be generated next may be set as an initial value, or an image saved in the external memory 204 in the image processing apparatus 100 may be used. If it is determined that the background setting is neither "optional image" nor "background image (initial value)" (NO in step S601 and NO in step S603), it is determined that the background setting is "background image (automatic update)". In this case, in step S605, the image combining unit 106 acquires the latest background image from the background update unit 104 and sets the latest background image as the background image. In step S606, the image combining unit 106 combines a predetermined image with a protection region transmitted from the image comparison unit 105 with respect to the background image determined as described above, thereby generating a privacy protection image.

Figure 7:
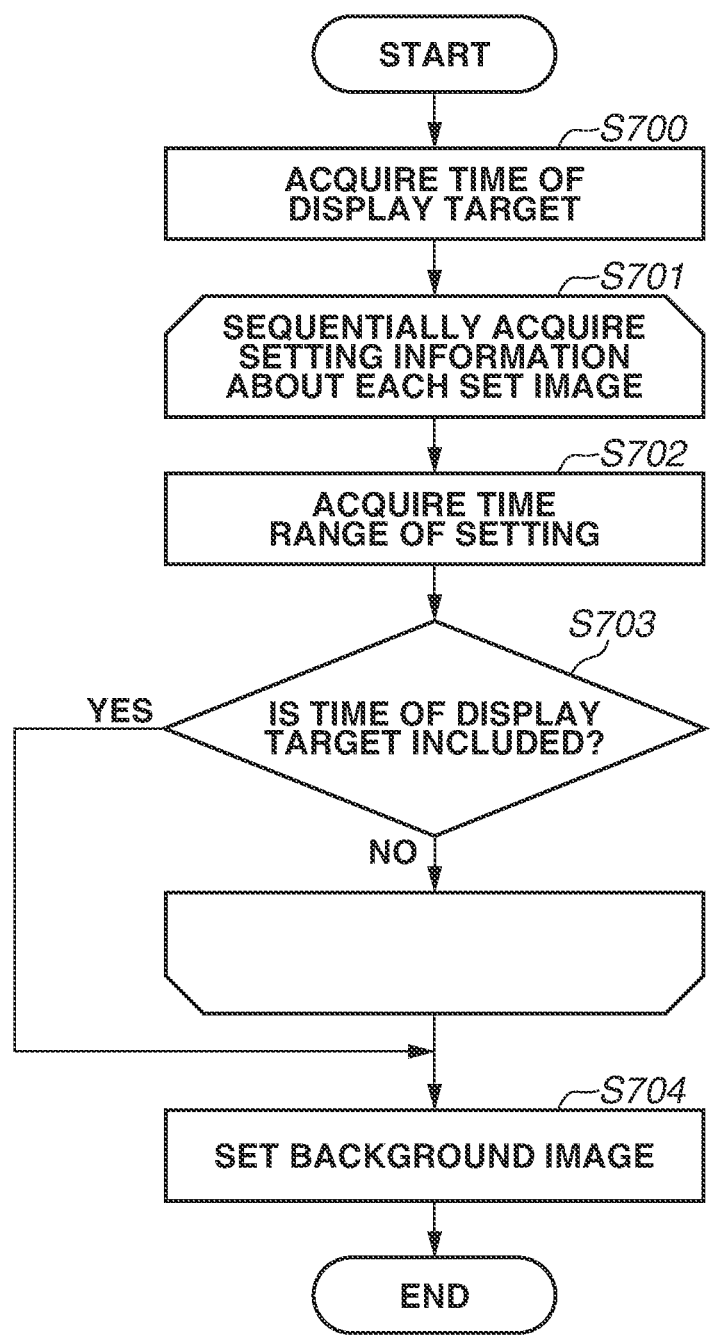
FIG. 7 is a flowchart illustrating an example of a process of acquiring an optional image according to the first exemplary embodiment.

FIG. 7 is a flowchart illustrating an example of the process of, in a case where the background setting is "optional image", selecting a set image to be used as the background image from a plurality of set images (step S602). In step S700, the image combining unit 106 acquires the time of a display target (the time of the acquired image) from the system current time of the image processing apparatus 100. The time of the display target may be acquired from the image capturing date and time assigned to header information of the acquired image. Next, in step S701, the image combining unit 106 sequentially acquires setting information associated with each set image from the combining setting information. In step S702, the image combining unit 106 acquires information about a time period from the setting information acquired in step S701. In step S703, the image combining unit 106 determines whether a time range indicated by the time period acquired in step S702 includes the time of the display target acquired in step S700. If it is determined that the acquired time period does not include the time of the display target (NO in step S703), the processing returns to step S701 so that a next set image is processed. If, on the other hand, the acquired time period includes the time of the display target (YES in step S703), then in step S704, the image combining unit 106 acquires the image based on the setting information about the set image and sets the image as the background image.

With the above processing according to the present exemplary embodiment, the video display system can set the method for obtaining a background image with respect to each input image, and in a case where an optional image is set as a background image, can also set the process of switching the background image according to the time period. If there is no image associated with setting information including a time period including the time of the display target, the processing exit from the loop of steps S701 to S703. In this case, the image combining unit 106 performs display indicating, for example, that no image can be presented.

A second exemplary embodiment will be described below. In the operation of setting an optional image from a recorded video in the first exemplary embodiment, the user specifies a recording date and time. In the second exemplary embodiment, a part of the process of setting an image from a recorded video is automated, thereby making the operation of the user simpler. The system configuration and the components of a system according to the second exemplary embodiment are similar to those according to the first exemplary embodiment.

Figure 8:
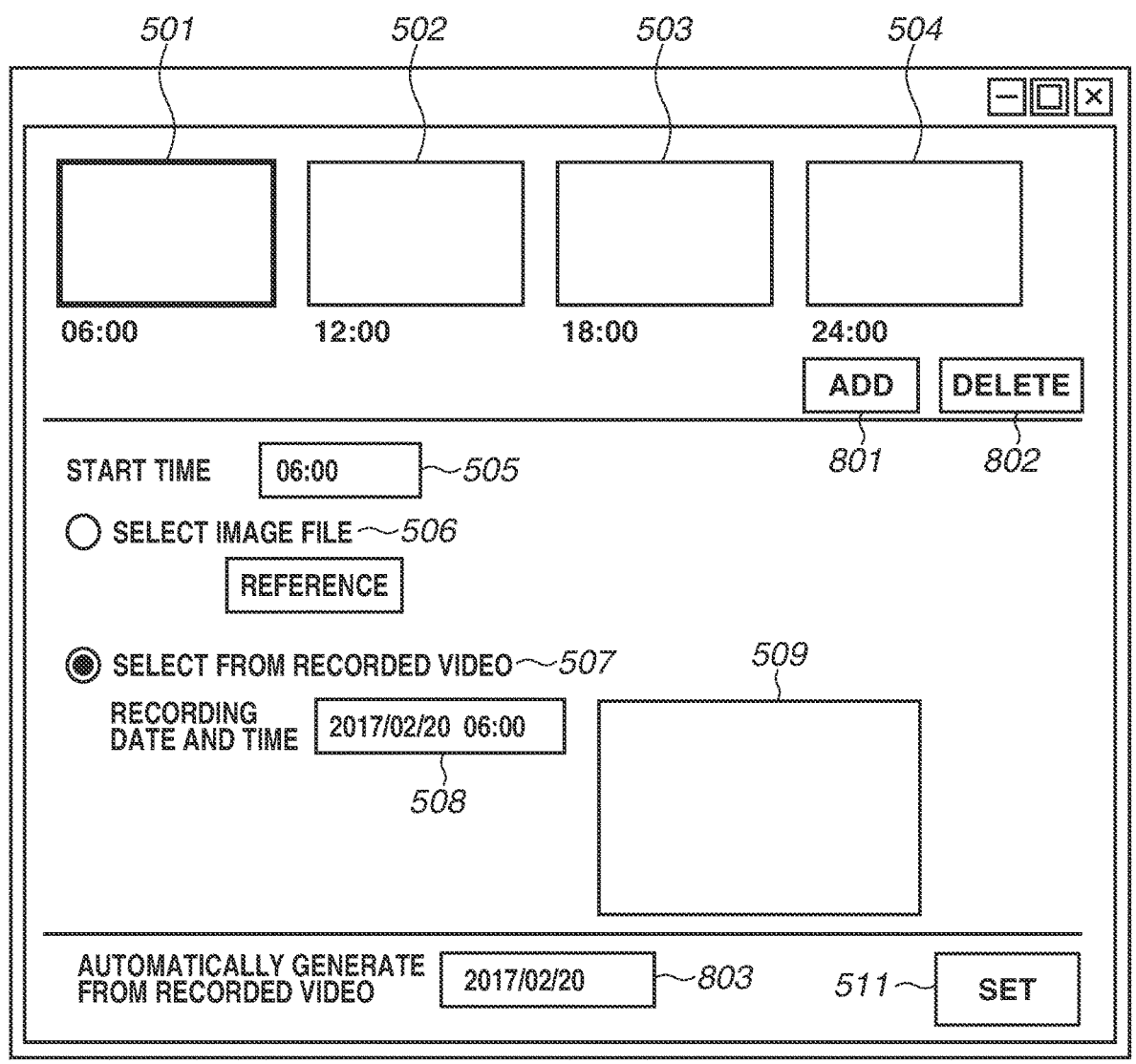
FIG. 8 is a diagram illustrating an example of a setting operation UI for an optional image in a combining setting according to a second exemplary embodiment.

FIG. 8 is an example of a setting screen in which a part of the operation of setting an optional image from a recorded video is automated. Components similar to those in the first exemplary embodiment (FIG. 5) are designated by the same numerals. This setting screen is different from the setting screen illustrated in FIG. 5 in that an add button 801 and a delete button 802 for performing the operation of increasing or decreasing the number of previews are provided. In the second exemplary embodiment, it is possible to increase or decrease the number of previews by operating the add button 801 or the delete button 802. Alternatively, the user may be allowed to specify the number of previews by a numerical value. The number of previews is used as a number by which to divide a time period.

A recording date 803 is an operation item for the user to select the date of a recorded video to be used as the background image. If the date is specified in the recording date 803, the combining setting unit 109 automatically selects as many set images as the number of previews from a recorded image with the specified date. According to the specifying of the date in the recording date 803, the combining setting unit 109 acquires from the video recording apparatus 305 the recorded video with the specified date among recorded videos of the network camera currently selected in the list of cameras 401. The combining setting unit 109 analyzes the recorded video with the date specified in the recording date 803 and selects a recording date and time to be used so that the amounts of change in, i.e., the differences between, images are constant with the above number of previews.

For example, the combining setting unit 109 analyzes changes in the luminance of recording data (for a day) with the date specified in the recording date 803 and divides two times the range from the maximum to minimum values of the luminance by the number of previews, thereby calculating a constant difference value. The combining setting unit 109 then sets, as the date and time of the first set image, the recording time at which the minimum value is obtained. Then, the combining setting unit 109 sequentially selects, as the date and time of each set image, a recording time corresponding to a luminance value obtained by adding the constant difference value to the minimum value. If the recording time is reached at which the maximum value is obtained, the combining setting unit 109 selects this recording time as the date and time of a set image. From this point forward, the combining setting unit 109 sequentially obtains a recording time corresponding to a luminance value obtained by subtracting the constant difference value from the maximum value. As described above, the combining setting unit 109 selects as many set images as the number of previews. Alternatively, using set images automatically selected by the combining setting unit 109 as described above as initial values, the user may be allowed to determine appropriate set images with these initial values as clues (e.g., by observing images at times before and after the initial values).

As described above, the combining setting unit 109 automatically selects as many images as specified by the user and displays previews of these images in preview regions (501 to 504). A time period to be associated with each image is automatically set based on the recording times of the selected images. For example, as the start time of each time period, the recording date and time (the recording time) of each image is used, and as the end time of the time period, a time immediately before the start time of a next time period is set. Alternatively, as the start time of each time period, a time obtained by dividing 24 hours by the number of previews and assigning the time elapsed from 0:00 to each division result may be used. The differences may be obtained by analyzing changes in the luminance of the recorded video. Settings automatically generated as described above may be set as initial values, and may be able to be changed by an operation of the user. Alternatively, images at times obtained by dividing 24 hours by the number of previews and assigning the time elapsed from 0:00 to each division result may be selected from a recorded video with a specified date and provided as the initial values of set images for the user. The user can determine appropriate set images with the provided initial values of the set images as clues (e.g., by observing images at times before and after the initial values).

As described above, according to the second exemplary embodiment, according to a user operation including the specifying of the number of images to be selected and the specifying of the date of a recorded video, and based on the amounts of change in images in an image group included in the recorded video with the specified date, the specified number of images are selected from the image group. For example, the specified number of images are selected so that the amounts of change in the images in the image group that are included in respective time periods are equal to each other. Then, the selected images are set as set images to be used as a background image. According to the second exemplary embodiment, since a plurality of set images can be automatically selected, a setting operation by the user is reduced.

<Variations>

In the first and second exemplary embodiments, an optional image to be used as a background image is specified based on a time period. Thus, the difference between the background image and an actual image may be great depending on the weather or the season. To that end, the combining setting unit 109 may assign information about the period of use of the date to information about a background setting. In this case, the image combining unit 106 manages a plurality of background settings with respect to each period of use of the date set by the combining setting unit 109 and switches a background setting to be used according to the date of a display target (an acquired image).

In the first and second exemplary embodiments, the image combining unit 106 uses as a background image a set image in a time period simply including the time of a display target. The present invention, however, is not limited to this. For example, the image combining unit 106 may acquire a set image in a time period selected based on the time of a display target and set images in the time periods before and after the selected time period and use as a background image the image having the smallest difference from the acquired image among the set images. Examples of the method for comparing the acquired image and each set image include the use of the difference in luminance. The present invention, however, is not limited to this.

Alternatively, the image combining unit 106 may select a plurality of set images based on the time of a display target and combine the plurality of set images, thereby generating a background image. In this case, for example, the image combining unit 106 acquires a set image in a first time period selected based on the time of the display target and the start time of the first time period, and a set image in a second time period after the selected first time period and the start time of the second time period. The image combining unit 106 calculates the proportions of the time difference between the start time of the first time period and the time of the display target, and the time difference between the time of the display target and the start time of the second time period. Then, using the proportions of the time differences, the image combining unit 106 combines the set image in the first time period and the set image in the second time period and uses the obtained composite image as a background image. At this time, the set image having a smaller time difference contributes more to the composite image.

While desirable exemplary embodiments of the present invention have been described, the present invention is not limited to these exemplary embodiments, but can be modified and changed in various manners within the scope of the present invention.

Other Exemplary Embodiments

The present invention can also be implemented by the process of supplying a program for realizing one or more functions of the above exemplary embodiments to a system or an apparatus via a network or a storage medium, and of causing one or more processors of a computer of the system or the apparatus to read and execute the program. Further, the present invention can also be realized by a circuit (e.g., an application-specific integrated circuit (ASIC)) for achieving the one or more functions.

According to the above exemplary embodiments, it is possible to achieve more appropriate privacy protection in the generation of a privacy protection image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-040923, filed Mar. 3, 2017, which is hereby incorporated by reference herein in its entirety.

What is claimed is:

1. An image processing apparatus which generates a privacy protected image by combining a background image with a protection image for protecting a privacy of a target in a captured image captured by an imaging unit, the image processing apparatus comprising:
   a receiving unit configured to receive information on a user instruction for setting a plurality of background images, wherein each of the plurality of background images is associated with a different one of a plurality of times;
   a control unit configured to cause a display unit to display a screen including the plurality of background images and the plurality of times, the plurality of background images being set based on the user instruction;
   an identifying unit configured to identify the target of privacy protection in the captured image;
   a selecting unit configured to select, based on at least one of the plurality of times, a background image from the plurality of background images; and
   a combining unit configured to generate the privacy protected image by combining the protection image, corresponding to the target, with the background image selected by the selecting unit.

2. The image processing apparatus according to claim 1, wherein the control unit causes the display unit to display the privacy protected image generated by the combining unit.

3. The image processing apparatus according to claim 1, wherein each of the plurality of times indicates a start time of a different one of a plurality of time periods,
   wherein the selecting unit selects the background image from the plurality of background images, the selected background image being associated with a start time of a time period including a time when the captured image is captured.

4. The image processing apparatus according to claim 1, wherein the receiving unit receives information on a user instruction for specifying a recording date and time or a frame number.

5. The image processing apparatus according to claim 4, wherein the control unit causes the display unit to display the screen including an image with the recording date and time or the frame number specified by the user instruction, and wherein the receiving unit receives information on a user instruction for specifying the image displayed on the display unit as one of the plurality of background images.

6. The image processing apparatus according to claim 4, wherein the receiving unit receives a user instruction for specifying the number of the plurality of background images and specifying a date of a recorded video, wherein, based on amounts of change in images in an image group included in the recorded video with the specified date, the specified number of images from the image group are set as the plurality of background images.

7. The image processing apparatus according to claim 6, wherein the selecting unit selects the specified number of images so that the amounts of change are equal to each other.

8. The image processing apparatus according to claim 6, wherein based on a recording time of the background image, the selecting unit sets a time to be associated with the background image.

9. The image processing apparatus according to claim 1, wherein the receiving unit receives information on a user instruction for setting a plurality of background images and the plurality of times.

10. The image processing apparatus according to claim 1, wherein the identifying unit identifies the target in the captured image, based on a change in the captured image.

11. A control method which generates a privacy protected image by combining a background image with a protection image for protecting a privacy of a target in a captured image captured by an imaging unit, the control method comprising:

receiving information on a user instruction for setting a plurality of background images, wherein each of the plurality of background images is associated with a different one of a plurality of times;

causing a display unit to display a screen including the plurality of background images and the plurality of times, the plurality of background images being set based on the user instruction;

identifying the target of privacy protection in the captured image;

selecting, based on at least one of the plurality of times, a background image from the plurality of background images; and generating the privacy protected image by combining the protection image, corresponding to the target, with the background image selected in the selecting.

12. A computer-readable non-transitory recording medium having stored therein a program that, when implemented by a computer, causes the computer to function as an image processing apparatus according to claim 1.

* * * * *